Jan. 30, 1962     C. A. CHRISTOFF     3,018,665
MOTION CONVERSION MECHANISM

Filed Oct. 21, 1960     2 Sheets-Sheet 1

INVENTOR
CHRIS A. CHRISTOFF
BY
ATTORNEY

Jan. 30, 1962 C. A. CHRISTOFF 3,018,665
MOTION CONVERSION MECHANISM
Filed Oct. 21, 1960 2 Sheets-Sheet 2

INVENTOR
CHRIS A. CHRISTOFF
BY
ATTORNEY

United States Patent Office 3,018,665
Patented Jan. 30, 1962

3,018,665
MOTION CONVERSION MECHANISM
Chris A. Christoff, San Gabriel, Calif., assignor to Clary Corporation, San Gabriel, Calif., a corporation of California
Filed Oct. 21, 1960, Ser. No. 64,054
20 Claims. (Cl. 74—99)

This invention relates to a magnetically operated device and more particularly to a rotary solenoid actuator effective to convert linear motion into rotary motion.

Heretofore, rotary solenoid actuators of the above type generally used pins riding in cam slots or balls riding in inclined grooves for converting linear motion derived from a linearly movable electromagnetic device to rotary motion.

Such actuators have proven relatively satisfactory. However, as is well known, the magnetic force between the pole pieces and the armature of an electromagnet varies inversely as the square of the distance between them. Therefore, it is essential to limit travel of the armature to a relatively short linear movement which requires that the cam slots and inclined grooves of such devices assume what is generally considered an undersirable camming or wedging angle in order to provide a satisfactory amount of rotary movement.

Another disadvantage of the above mentioned types of actuators is that they require relatively heavy masses to be carried on their output shafts for actuating the driven means. This prevents fast repetitive action of the solenoid.

A still further disadvantage of the above rotary solenoid actuators is the lack of adjustment means for adjusting the output torque characteristic thereof.

Therefore, it becomes a principal object of the present invention to overcome the above noted defects of prior actuators of the above type.

Another object is to provide means to adjust for a desired degree of output shaft rotation in an actuator of the above type.

Another object is to provide a rotary solenoid actuator having a relatively high efficiency.

Another object is to provide a rotary solenoid whose output shaft is restrained from axial movement, while intermittently rotating in one direction.

Another object is to provide a rotary solenoid actuator having a maximum torque output with a minimum axial movement of the electromagnetic elements.

Another object is to provide an actuator of the above type in which the rotary elements embody a minimum amount of mass to permit relatively fast response.

A still further object is to provide an actuator of the above type in which the operating characteristics may be adjusted as desired.

The manner in which the above and other objects are accomplished will be readily understood on reference to the following specification when read in conjunction with the accompanying drawings, wherein.

Figure 2:
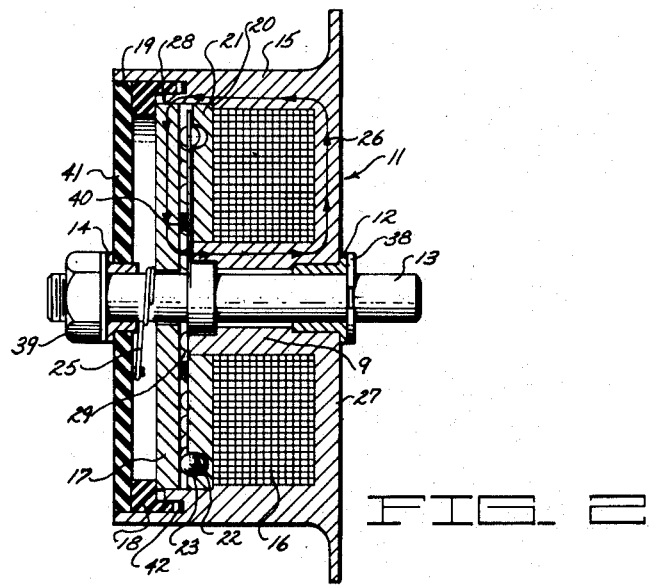
FIG. 2 is a cross sectional view taken along the line 2—2 of FIG. 1.

The rotary solenoid comprises a casing 11 (FIG. 2) formed of a magnetic material having a low magnetic retentivety and consisting of a backing plate 27, an outer cylindrical shell 15, and a core 9. Wound intermediate the shell 15 and the core 9 is an electromagnetic coil 16.

An output shaft 13, preferably formed of a nonmagnetic material, such as stainless steel, is rotatably supported in bearings 12 and 14 which are secured in the casing 11 and a cap member 41, respectively. The bearings 12 and 14 are also preferably formed of a nonmagnetic material.

A disc-shaped armature 17 of magnetic material is loosely mounted on the shaft 13 and is retained in its illustrated position by a spacer member 18 formed of a nonmagnetic material, the member 18 being slideably mounted in a relieved portion 19 of the shell 15 and being retained in position by the cover member 41.

A disc 21 of nonmagnetic material is securely mounted against an annular shoulder 20 on the shell 15, adjacent the coil 16, and has formed on the side facing the armature 17 an arcuate-shaped raceway 22 for retaining a set of balls 23.

An arm 24 is rigidly supported by the output shaft 13 in a depressed area 34 of the disc 21, between the disc 21 and the armature 17, and is urged in a counterclockwise direction, against an end ball 23a by a torsion spring 25 (FIG. 2), the spring having one of its ends attached to the shaft 13 and its opposite end attached to the cover member 41.

The coil 16, upon receiving an electrical pulse, will create a flux path 26 which passes through the core 9, backing plate 27, shell 15, a relatively small air gap 28, armature 17 and back through an air gap 29 to the core 9, thereby attracting the armature toward the disc 21.

Figure 4:
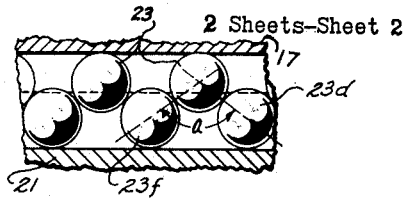
FIG. 4 is a transverse sectional view taken along line 4—4 of FIG. 3, showing the ball arrangement in the raceway.
Figure 3:
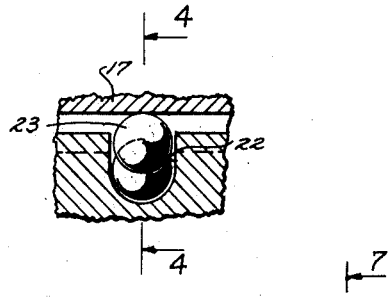
FIG. 3 is an enlarged fragmentary sectional view showing the relationship between the balls and their constraining means and is taken along line 3—3 of FIG. 1.

The balls 23 are so arranged in the raceway 22 of the disc 21 that, as the armature is attracted toward the disc 21, the balls will react with a toggle-like action which is brought about through the arrangement of the balls as shown in FIGS. 3 and 4, wherein alternate ones of the balls, i.e., 23b, straddle two adjacent balls 23f and 23d.

When the armature exerts pressure upon the balls, like ball 23b, it tends to force them between their respective adjacent balls, like balls 23c and 23d, thereby elongating the series of balls along the raceway 22. Since the end of the series of balls opposite the arm 24 is blocked, as will be described presently, the arm 24 will be driven in a clockwise direction to likewise partially rotate the shaft 13. The latter is preferably connected through a pawl and ratchet means (not shown) to provide an intermittent rotary output.

Figure 1:
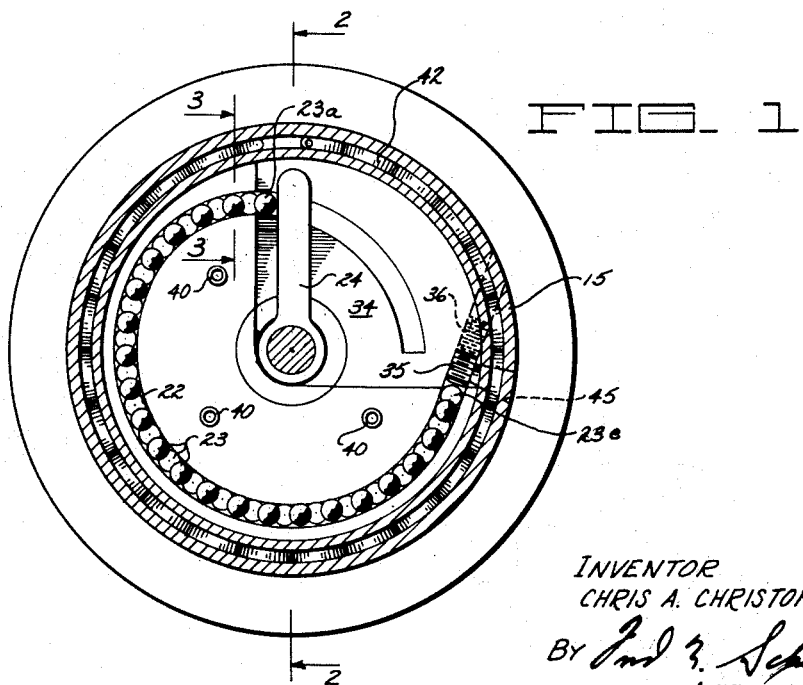
FIG. 1 is a sectional plan view through a preferred embodiment of the invention showing a rotary solenoid actuator for converting linear motion into rotary motion.

The raceway 22, as shown in FIG. 1, is preferably so formed as to develop a relatively large moment of force at the beginning of the stroke. This is obtained by forming the raceway so that the balls engage the outer end of the arm 24 at the beginning of the stroke and an inner portion toward the end of the stroke. Thus, a relatively large starting torque is developed to overcome starting friction of various parts, etc.

Due to the fact that the force between two adjacent magnetic poles, such as the armature 17 and shell 15, varies inversely as the square of the distance between them, this form of raceway has been found to provide a maximum stroke while providing a steady rotary output during each operation. However, the curvature of the raceway may be varied to produce any output characteristic desired.

For controlling the degree of rotation of the output shaft 13 as well as the output torque, there is provided a set screw 35 adjustable in a tapped hole 36. The hole 36 passes through the shell 15 and the plate 21 at such an angle that the screw 35 abuts an end ball 23e. By adjusting the set screw 35, the angle of throw of the shaft 13 may be varied as well as the output torque for a given linear movement of the armature 17.

Means are provided to adjust the linear movement of the armature 17 during each operation commensurate with the adjustment of the screw 35. For this purpose, there is provided an anchor nut 39 threaded on one end of the shaft 13 and a snap ring 38 at the opposite end. These elements prevent longitudinal movement of the shaft 13 relative to the actuator. However, upon an inward adjustment of the nut 39, it will force the top plate 41 and the spacer member 18 inwardly thereby moving the armature 17 closer to the balls 23 to compensate for an outward adjustment of the set screw 35. Upon an outward adjustment of the nut 39 a sinuous-shaped spring washer 42 intermediate the core and the member 18 will urge the cover 41 and member 18 outwardly away from the balls 23, allowing the springs 40 to move the armature outwardly, thereby compensating for an inward adjustment of the set screw 35.

Another means for adjusting the amount of angular displacement of the output shaft is to add or subtract balls 23 from the series, which is done by backing off the adjustment screw 35 past a relieved hole 45 which passes through the casing 15 and the disc 21 into the raceway 22, thereby allowing access to the raceway for removing or adding balls.

From the above it will be seen that outward adjustment of the set screw 35 and corresponding inward adjustment of the nut 39 will result in a closer spacing of the armature and shell 15 so that a greater initial magnetic force is applied to the armature with a given voltage applied to the coil. At the same time, the initial included angle "a" between each group of adjacent balls becomes greater with such outward adjustment of the set screw so that a greater lengthwise thrust is exerted by the series of balls for a given force applied by the armature. Accordingly, a greater torque will be applied to the shaft 13.

Figure 5:
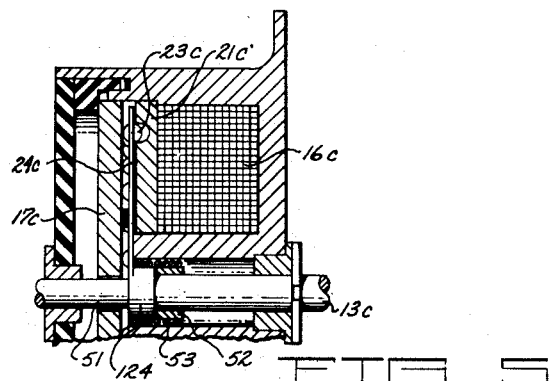
FIG. 5 is a partial sectional view, similar to FIG. 2, but illustrating a modified form of the invention wherein a spring clutching means is integrally provided within the actuator.

In FIG. 5 is shown an alternate form of the invention wherein a one-way spring clutch device is retained within the actuator to provide intermittent movement in one direction only of the output shaft 13.

In the above mentioned alternate form, the basic construction is the same as that shown in FIGS. 1 to 4 except that the arm 24c is rotatably mounted on a reduced section 51 of the shaft 13c and a collar 52, having the same outer diameter as the diameter of hub 124 of arm 24c, is mounted on the shaft 13c juxtaposed to the arm. A spring 53 is attached to the hub 124 of the arm and is wound around its outer periphery and also around the outer periphery of the collar 52.

When the coil 16c is energized and the armature 17c is drawn toward the plate 21c, the reaction of the balls 23c will rotate the arm 24c and the spring 53 will therefore tighten around the hub 124 and the collar 52, driving the collar and, through said collar, the shaft 13c. Upon de-energization of the coil, the armature, balls and arm will return to their home position unwinding the spring 53 so as to leave shaft 13c in its new position.

Figure 7:
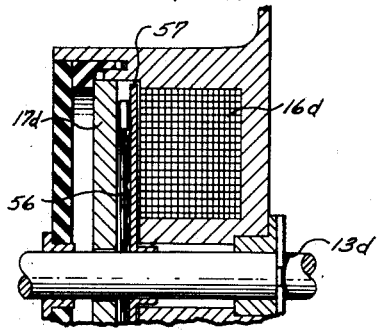
FIG. 7 is a fragmentary cross sectional view taken along the line 7—7 of FIG. 6.
Figure 6:
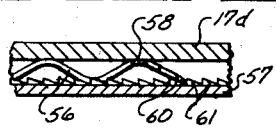
FIG. 6 is a sectional plan view of another modified form of the invention showing an alternate means for converting linear motion into rotary motion through a sinuous spring.
Figure 8:
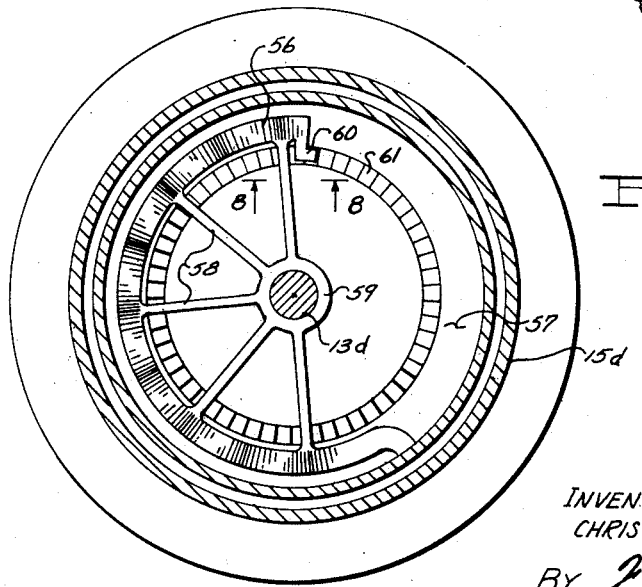
FIG. 8 is a fragmentary cross sectional view taken substantially along the line 8—8 of FIG. 6.

Another alternate form of the invention is shown in FIGS. 6 and 7 wherein a sinuous-type spring 56 is used in place of the balls 23 and a ratchet-type disc 57, preferably of nonmagnetic material, is suitably fastened on the output shaft 13d in place of the disc 21.

The spring 56, formed of a nonmagnetic material and shaped in an arc about the output shaft 13d, is retained in this arcuate shape by spokes 58 extending from a hub 59 surrounding the shaft 13d.

At one end, the spring 56 is anchored to the cylindrical shell 15d, and at the opposite end the spring is shaped to form a tooth 60 engageable with teeth 61 in disc 57. As the armature 17d is drawn inward it will compress and thereby elongate the spring 56, causing the toothed end thereof to move in an arcuate manner. Accordingly, the tooth 60 will engage and drive the ratchet disc 57 and the output shaft 13d.

Upon de-energization of the coil 16d, the spring 56 will contract to its original shape ratcheting its tooth back over the teeth of the ratchet disc 57, leaving said disc and output shaft in their new position.

Although the invention has been described herein in detail and certain specific terms and languages have been used, it is to be understood that the present disclosure is illustrative rather than restrictive and that changes and modifications may be made without departing from the spirit or scope of the invention as set forth in the appended claims.

Having thus described the invention, what is desired to secure by United States Letters Patent is:

1. A device for changing linear motion to rotary motion comprising a pair of spaced parallel members, means supporting one of said members for movement toward the other, actuator means forming a plurality of toggle linkage units arranged end-to-end intermediate said members and located in at least a substantially arcuate pattern, each of said toggle linkage units being extended in length by said members upon movement of said one member toward the other, means movable about an axis coincident with an approximate center of said pattern, and means operable by said actuator means upon elongation thereof for moving said last mentioned means.

2. A device for changing linear movement to rotary motion comprising a pair of spaced parallel members, means supporting said members for relative movement toward each other, actuator means forming a plurality of toggle linkage units arranged end-to-end intermediate said members and located in a generally arcuate pattern, each of said toggle linkage units being extended in length by said members upon relative movement of said members toward each other, means anchoring one end of said actuator means, a device movable about the approximate axis of said pattern, and means actuated by the opposite end of said actuator means for moving said device.

3. A device for changing linear motion to rotary motion comprising a pair of spaced parallel members, means supporting one of said members for movement toward and away from the other, electromagnetic means for moving said one member toward the other, actuator means comprising a plurality of toggle linkage units arranged in end-to-end fashion intermediate said members and located in an arcuate pattern, each of said toggle linkage units being extended in length by said members upon movement of said one member toward the other, means anchoring one end of said actuator means, means pivotal about the axis of said arcuate pattern and actuated in one direction by the opposite end of said actuator means, and spring means for moving said last mentioned means in the opposite direction whereby to contact said toggle linkage units.

4. A device for changing linear motion to rotary motion comprising a pair of parallel spaced members, means supporting said members for relative movement toward each other, actuator means forming a plurality of toggle linkage units intermediate said members and arranged in end-to-end fashion about an axis passing through said members, each of said toggle linkage units being extended in length by said members upon relative movement of said members toward each other, means anchoring one end of said actuator means, and a device movable about said center and actuated by the opposite end of said actuator means.

5. A device for changing linear motion to rotary motion comprising a pair of parallel spaced members, means supporting one of said members for movement toward the other, acuator means comprising a plurality of toggle linkage units intermediate said members and arranged in end-to-end fashion about an axis extending through said members, each of said toggle linkage units being extended in length by said members upon movement of said one member toward the other, means anchoring one end of said actuator means, a driven element rotatable about said axis, and a one way drive element movable about said axis and engageable with said driven element for advancing said driven element, said drive element being actuated by the opposite end of said actuator means.

6. A device for changing linear motion to rotary motion comprising a pair of spaced parallel members, means supporting one of said members for movement toward and away from the other, electromagnetic means for moving said one member toward the other, actuator means forming a plurality of toggle linkage units intermediate said members, said toggle linkage units being arranged in end-to-end fashion about an axis extending through said members, each of said toggle linkage units being extended in length by said members upon movement of said one member toward the other, means anchoring one end of said actuator means, a driven element rotatable about said axis, a drive element movable about said axis and engageable with said driven element for advancing said driven element in one direction only, said drive element being actuated in a directon to advance said driven element by the opposite end of said actuator means, and spring means for returning said drive element in the opposite direction.

7. A rotary actuator as comprising a support, a shaft carried by said support for rotary movement, a first plate member carried by said support, a second plate member carried by said support for movement toward said first plate member, actuator means forming a plurality of toggle linkage units intermediate said plate members and arranged in end-to-end fashion about said axis, each of said toggle linkage units being extended in length by said plate members upon movement of said second plate member toward said first plate member, means on said support preventing movement of one end of said actuating means, means on said shaft engageable by the opposite end of said actuator means, and means for moving said second plate member toward said first plate member.

8. A rotary actuator device comprising a support, a shaft carried by said support for rotary movement, a first plate member carried by said support, a second plate member carried by said support for movement toward said first plate member, said second plate member forming an electromagnetic armature and surrounding said shaft, actuator means forming a plurality of toggle linkage units intermediate said plate members and arranged in end-to-end fashion about said shaft, each of said toggle linkage units being extended in length by said plate members upon movement of said second plate member toward said first plate member, means on said support preventing movement of one end of said actuator means, a driven element rotatable about the axis of said shaft, a drive element operable by the opposite end of said actuator means, said drive element being effective to drive said driven element, and a solenoid coil carried by said support and surrounding said shaft for attracting said armature.

9. A rotary actuator comprisng a series of balls, means constraining said balls to move in a path extending about an axis, alternate ones of said balls straddling two adjacent balls in such a manner that a line passing through the center of each alternate ball and its said adjacent ball forms an angle with a line extending parallel to said axis, means for transversely compressing said series whereby to elongate the same, and means movable about said axis and actuated by said series of balls upon elongation thereof.

10. A rotary actuator device comprising a pair of parallel spaced plate members, means supporting said plate members for relative movement toward each other, a series of balls intermediate said plate members, means constraining said balls to move in a path extending about an axis passing through said plate members, alternate ones of said balls straddling two adjacent balls in such manner that a line passing through the center of each alternate ball and its said adjacent ball forms an angle with a line extending parallel to said axis whereby said series is elongated upon relative movement of said plate members toward each other, and means movable about said axis and actuated by said series of balls upon elongation thereof.

11. A rotary actuator device comprising a pair of parallel spaced plate members, means supporting said plate members for relative movement toward each other, a series of balls intermediate said plate members, means constraining said balls to move in a path extending about an axis passing through said plate members, alternate ones of said balls straddling two adjacent balls in such manner that a line passing through the center of each alternate ball and its said adjacent ball forms an angle with a line extending parallel to said axis whereby said series is elongated upon relative movement of said plate members toward each other, means anchoring one end of said series of balls, and means movable about said axis and actuated by the opposite end of said series of balls upon elongation thereof.

12. A rotary actuator device comprising a pair of parallel spaced plate members, means supporting one of said plate members from movement toward and away from the other, a series of balls intermediate said plate members, means constraining said balls to move in a path extending about an axis passing through said plate members, alternate ones of said balls straddling two adjacent balls in such manner that a line passing through the center of each alternate ball and its said adjacent ball forms an angle with a line extending parallel to said axis, means anchoring one end of said series of balls, means movable about said axis and actuated by the opposite end of said series of balls upon movement of said one of said plate members toward the other, and spring means for returning said last mentioned means.

13. A rotary actuator device comprising a pair of parallel spaced plate members, electromagnetic means for moving one of said plate members toward the other, a series of balls intermediate said plate members, means constraining said balls to move in a path extending about an axis passing through said plate members, alternate ones of said balls straddling adjacent balls in such manner that a line passing through the center of each alternate ball and its said adjacent ball forms an angle with a second line extending parallel to said axis, means anchoring one end of said series of balls, a device movable about said axis and actuated from a first position to a second position by the opposite end of said series of balls upon movement of one of said plate members toward the other, means for preventing movement of said alternate balls to positions wherein said line passing through the center of each alternate ball and its said adjacent ball extends at right angles to said second line, and spring means for returning said device to said first position.

14. A rotary actuator device comprising a support, a shaft carried by said support for rotary movement, a plate member carried by said support, an armature carried by said support for movement toward said plate member, a series of balls intermediate said plate member and said armature, means constraining said balls to move in at least a substantially arcuate path extending about an axis passing through said plate member and said armature, alternate ones of said balls straddling adjacent balls in such manner that a line passing through the center of each alternate ball and its said adjacent ball forms an angle with a second line extending parallel to said axis, means on said support anchoring one end of said series of balls, means intermediate said plate member and said armature actuated by the opposite end of said series of balls, and a solenoid coil carried by said support for attracting said armature to cause rotary movement of said shaft.

15. A rotary actuator comprising a pair of parallel members spaced along an axis, means supporting one of said members for movement along said axis toward the other, a sinuous spring element intermediate said members and extending about said axis, said spring element engaging said members at a plurality of positions along the length of said spring element, means anchoring one end of said spring element, and means movable about said axis and actuated by the opposite end of said spring element upon movement of said one member toward the other.

16. A rotary actuator comprising a pair of parallel spaced members, means supporting one of said members from movement toward the other, a sinuous spring element intermediate said members and extending about an axis passing through said members, said spring element engaging said members at a plurality of positions along the length of said spring element and adapted to elongate upon compression of the peaks thereof by said members, means constraining said spring element to move in a predetermined path about said axis, means anchoring one end of said spring element, and means movable about said axis and actuated by the opposite end of said spring element upon movement of said one member toward the other.

17. A rotary actuator device comprising a pair of spaced parallel members, means supporting one of said members for movement toward the other, an arcuate sinuous spring element intermediate said members and located about an axis passing through said members, said spring element engaging said members at a plurality of points along the length of said spring element and adapted to elongate upon transverse compression thereof by said members, a drive element movable about said axis, and means operable by said spring element upon elongation thereof for moving said drive element.

18. A rotary actuator device comprising an arcuately extending elongate spring member extending about an axis, said spring member having a sinuous shape with alternate peaks and valleys extending therealong, means for transversely compressing said peaks and valleys whereby to elongate said spring member, a drive element movable about said axis, and means operable by said spring member upon elongation thereof for moving said drive element about said axis.

19. A rotary actuator device comprising an arcuately extending elongate spring member extending about an axis, said spring member having a sinuous shape with alternate peaks and valleys extending therealong, means for transversely compressing said peaks and valleys whereby to elongate said spring member, means for anchoring one end of said spring member, a drive element movable about said axis, and means operable by the opposite end of said spring member upon elongation thereof for moving said drive element about said axis.

20. A rotary actuator device comprising an arcuately extending elongate spring member, said spring member having transversely extending peaks and valleys spaced alternately thereon, plate members on opposite sides of said spring member, means for effecting relative movement of said plate members toward each other whereby to transversely compress said spring member to increase the length thereof, and a drive means movable about said axis and actuated by said spring member upon elongation thereof.

References Cited in the file of this patent

UNITED STATES PATENTS

| 1,076,422 | Coburg et al. | Apr. 21, 1954 |
| 2,828,636 | Hall | Apr. 1, 1958 |